United States Patent [19]

Ulivi

[11] 4,064,659
[45] Dec. 27, 1977

[54] APPARATUS FOR CENTERING SHEETS OF GLASS ON THE PLATFORM OF A MACHINE

[75] Inventor: Moreno Ulivi, Pisa, Italy

[73] Assignee: Saint-Gobain Industries, Neuilly-sur-Seine, France

[21] Appl. No.: 664,029

[22] Filed: Mar. 4, 1976

[30] Foreign Application Priority Data

Mar. 4, 1975 France .............................. 75.06640

[51] Int. Cl.² .............................................. B24B 19/00
[52] U.S. Cl. ..................................... 51/277; 198/345; 51/101 R
[58] Field of Search ................. 51/277, 101 R, 100 R, 51/134; 269/232; 214/1 BB; 198/345, 413, 434

[56] References Cited

U.S. PATENT DOCUMENTS

| | | | |
|---|---|---|---|
| 2,174,721 | 10/1939 | Gugala | 51/134 |
| 2,579,337 | 12/1951 | Reaser et al. | 51/101 R |
| 2,906,065 | 9/1959 | Reaser | 51/101 R |
| 3,641,711 | 2/1972 | Halberschmidt | 51/100 R |

Primary Examiner—Harold D. Whitehead
Assistant Examiner—Roscoe V. Parker
Attorney, Agent, or Firm—Pennie & Edmonds

[57] ABSTRACT

A sheet of glass on a platform is centered by a plurality of pins around the periphery thereof. Drive mechanism for the pins moves a pin-carrying support from a rest position in which the pin is turned down below the plane of the sheet and retracted from the sheet to an upright working position in which the pin is advanced into engagement with the sheet, and vice versa. Means are provided for guiding the pin-carrying support during the movements thereof, and adjustable stop means limits the advance.

11 Claims, 7 Drawing Figures

APPARATUS FOR CENTERING SHEETS OF GLASS ON THE PLATFORM OF A MACHINE

The present invention relates to an automatic centering apparatus for centering sheets of glass and the like on the platform of a machine for finishing the edges or surfaces of the sheets.

The apparatus is designed to automatically and accurately center the sheets of glass with respect to a templet of suitable shape and dimensions and then to retract the centering elements so that the tool for working the edges or surfaces of the sheet, guided by the templet, can be moved closer and operated.

The invention relates particularly to machines for finishing the edges of glass sheets. These machines are designed to round-off and polish the edges of the sheets after the cutting process, and prior to the subsequent operations, for example tempering. They commonly include a rotating platform designed to support the sheet of glass and a grinding wheel for shaping the edges of the sheet. The sheet of glass, centered with respect to a templet of interchangeable form and dimensions and corresponding to the format of the sheets to be worked, is held on the platform. While the platform rotates, the grinding wheel, guided by a roller which engages the templet, works the edges of the sheet. In order for this working operation to be carried out with precision, it is important for the sheet of glass to be accurately positioned. To avoid an interruption in the manufacturing cycle, this operation is advantageously automatic.

The device according to the present invention enables this centering operation to be carried out automatically and accurately.

Apparatus in accordance with the invention includes a plurality of centering pins movable into contact with a sheet of glass on the platform, at spaced points on the periphery thereof. Drive mechanism for the pins comprises a frame and a pin-carrying support mounted on the frame for movement between a rest position in which the pin is turned down below the plane of a sheet on the platform, and an upright position for engaging the edge of the sheet. Drive means are provided for turning the support to the upright position of the pin carried thereby and advancing the support toward the platform, and for retracting the support away from the platform and turning the pin down to its rest position. Guide means are provided for guiding the support during the turning, advancing and retracting movements, and adjustable stop means are provided for limiting the advance of the support toward the platform.

Preferably each pin, in its upright position, is substantially perpendicular to the sheet on the platform, and the pin in its turned-down position is approximately parallel to the sheet. Advantageously the pin-carrying support is guided for movement substantially parallel to the plane of the sheet during the portions of the advancing and retracting movements adjacent the sheet.

Advantageously the guide means includes roller means mounted for rotation about a fixed axis with respect to the frame, and the pin-carrying support includes two guide planes having an included angle equal to the angle between the upright and rest positions of the pin, preferably 90°. The guide planes and roller means cooperate to turn the support from rest to upright positions, and vice versa, during the advancing and retracting of the support. A reciprocally driven carriage may be coupled to the pin-carrying support to advance and retract the support.

In accordance with another embodiment of the invention, the guide means includes two rectilinear guides fixedly mounted on the frame, and the pin-carrying support includes rollers cooperating with the rectilinear guides. The pin-carrying support is arranged to pivot about one of the rollers during the advancing and retracting thereof.

Other features and advantages of the invention will be apparent from the following description of specific embodiments thereof, in conjunction with the drawings in which.

Figure 1:
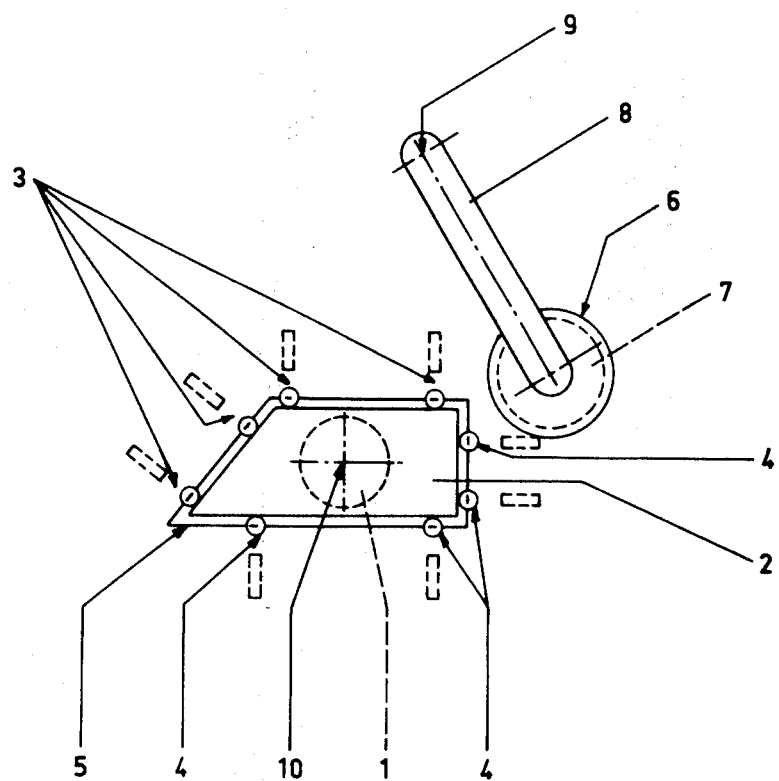
FIG. 1 is a diagrammatic plan view of the overall apparatus with a sheet of glass centered on the platform.

FIG. 1 illustrates a finishing machine wherein the sheets of glass are centered by apparatus according to the invention. The rotating platform 1 supports the sheet of glass 2. A plurality of pins 3 and 4 are distributed along the periphery of the sheet of glass to center it with respect to a templet 5 of suitable form and dimensions secured beneath the platform 1. A sufficient number of pins 3 and 4 must be provided, and these must be suitable distributed according to the shape and dimensions of the sheet of glass, to obtain accurate centering. The grinding wheel 6 and its guide roller 7 are supported by an arm 8 oscillating about an axis 9. As will be described hereinafter, the pins 3 and 4 are adapted to occupy both turned down rest positions which preferably are approximately parallel to the plane of the sheet of glass, spaced outwardly from the axis 10 of the platform and disposed beneath this plane, as indicated by the dotted rectangles adjacent the pins, and also work positions which are closer to the axis 10 of the platform and in which the pins are upright, preferably perpendicular to this plane.

When the sheet of glass 2 is placed on the platform 1 of the machine, the pins 3 are raised to their work positions as represented by the circles in the drawing; the pins 4 still remaining in their rest positions as indicated by the dotted rectangles. Immediately thereafter the pins 4 are raised into their work positions and are moved closer to the axis 10 of the platform. In the course of this movement, pins 4 are brought against the edges of the sheet of glass 2 and push it until it abuts against all the pins 3 which, as mentioned above, are already in the upright work position. The positions of the pins 3 and 4 are so adjusted that the sheet of glass pushed by the pins 4 is centered with respect to the templet 5 when is abuts against all the pins 3.

When the sheet of glass 2 has been centered, a pressing element (not shown) is applied to it and holds it on the platform 1. At this time, all the pins 3 and 4 return to the rest positions, thus releasing the edges of the sheet of glass so that the finishing operation can take place. The arm 8, which supports the grinding wheel 6 and its guide roller 7, pivots so as to bring the grinding wheel into contact with the edge of the sheet of glass. The grinding wheel grinds down the glass until its guide wheel rests against the templet 5. The platform 1 rotates through 360° so as to subject the entire periphery of the sheet of glass to the action of the grinding wheel.

Figure 2:
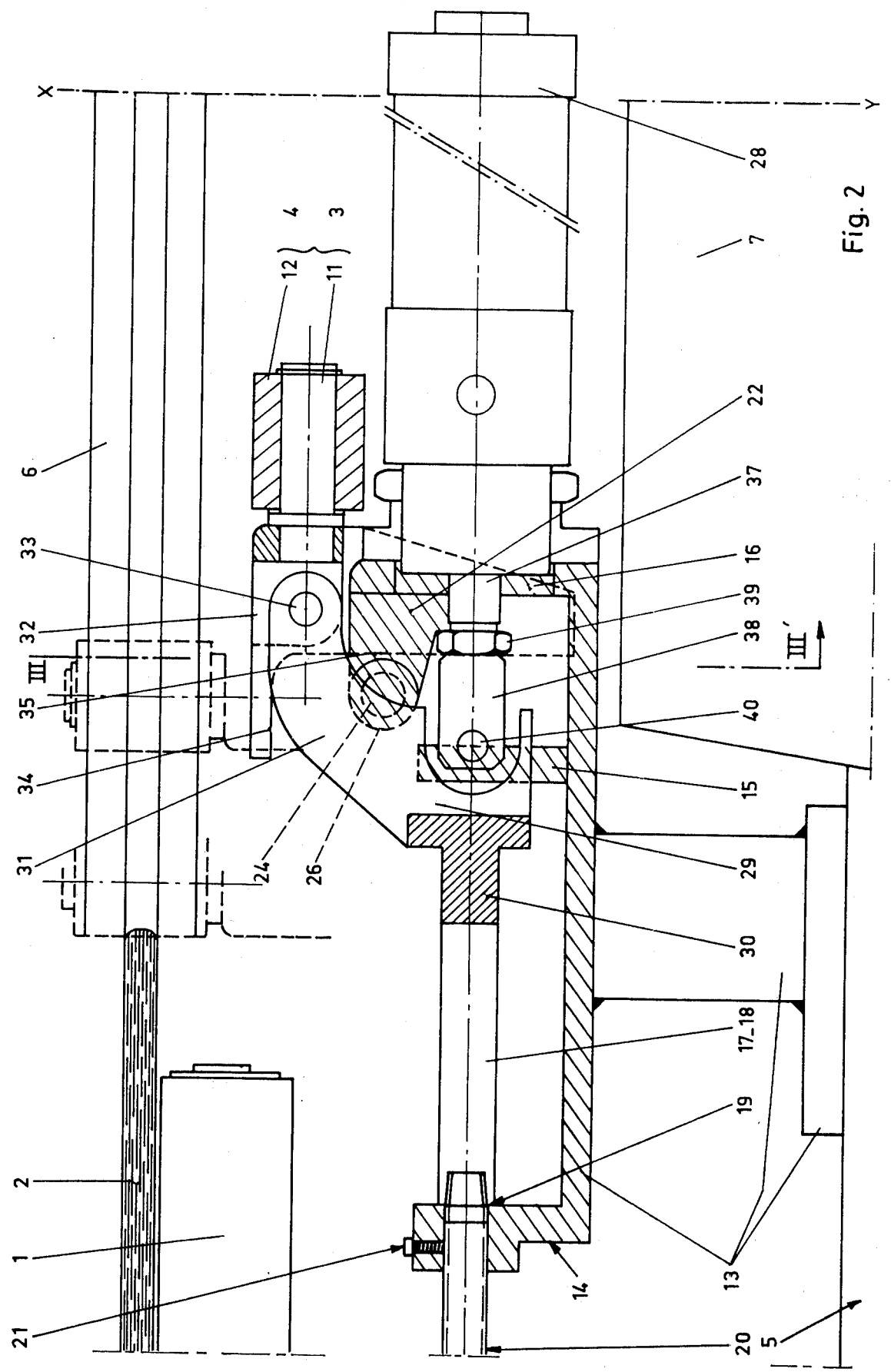
FIG. 2 is a vertical section of one embodiment of the pin drive mechanism.
Figure 3:
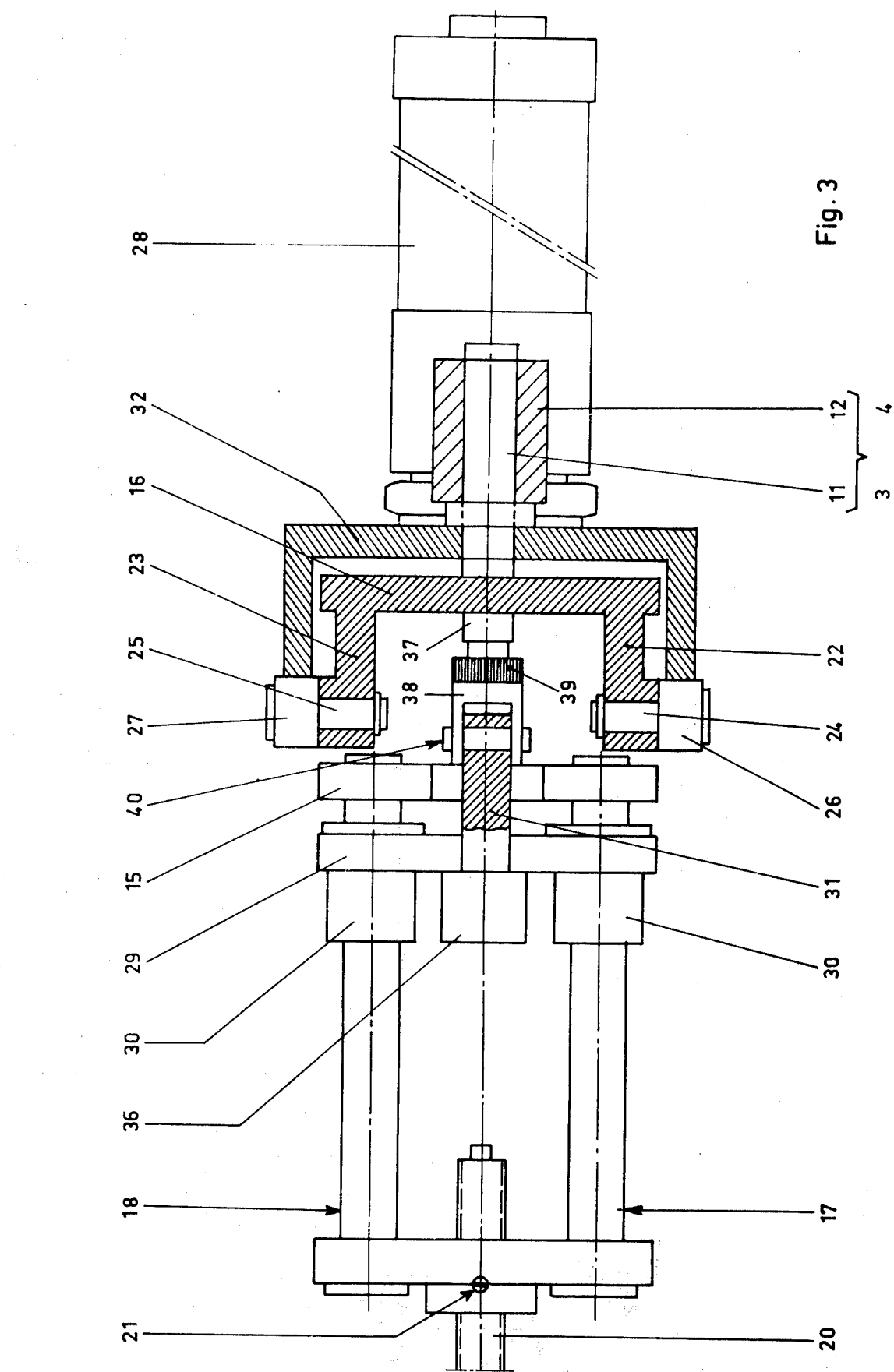
FIG. 3 is a horizontal section view of the pin drive mechanism of FIG. 2.

FIGS. 2, 3, 4 and 5 show a drive mechanism for a pin 3 or 4. In FIG. 2, 1 designates the rotating platform of the machine, 2 the sheet of glass, 3 or 4 a centering pin, 5 the templet, 6 the grinding wheel, 7 its guide roller, and XY the axis of the latter two elements. In FIG. 2, a pin 3, 4 is shown in unbroken lines in the down-turned rest position thereof parallel to the plane of the sheet of glass, retracted from the axis 10 (not shown) of the platform 1 and disposed beneath this plane. The grinding wheel 6 is in contact with the sheet 2 and the guide roller 7 with the templet 5. Thus, this figure represents the different elements in the positions which they occupy during the shaping operation. It will be noted that the grinding wheel has a recessed profile so as to round off the edges of the sheet of glass.

Figure 4:
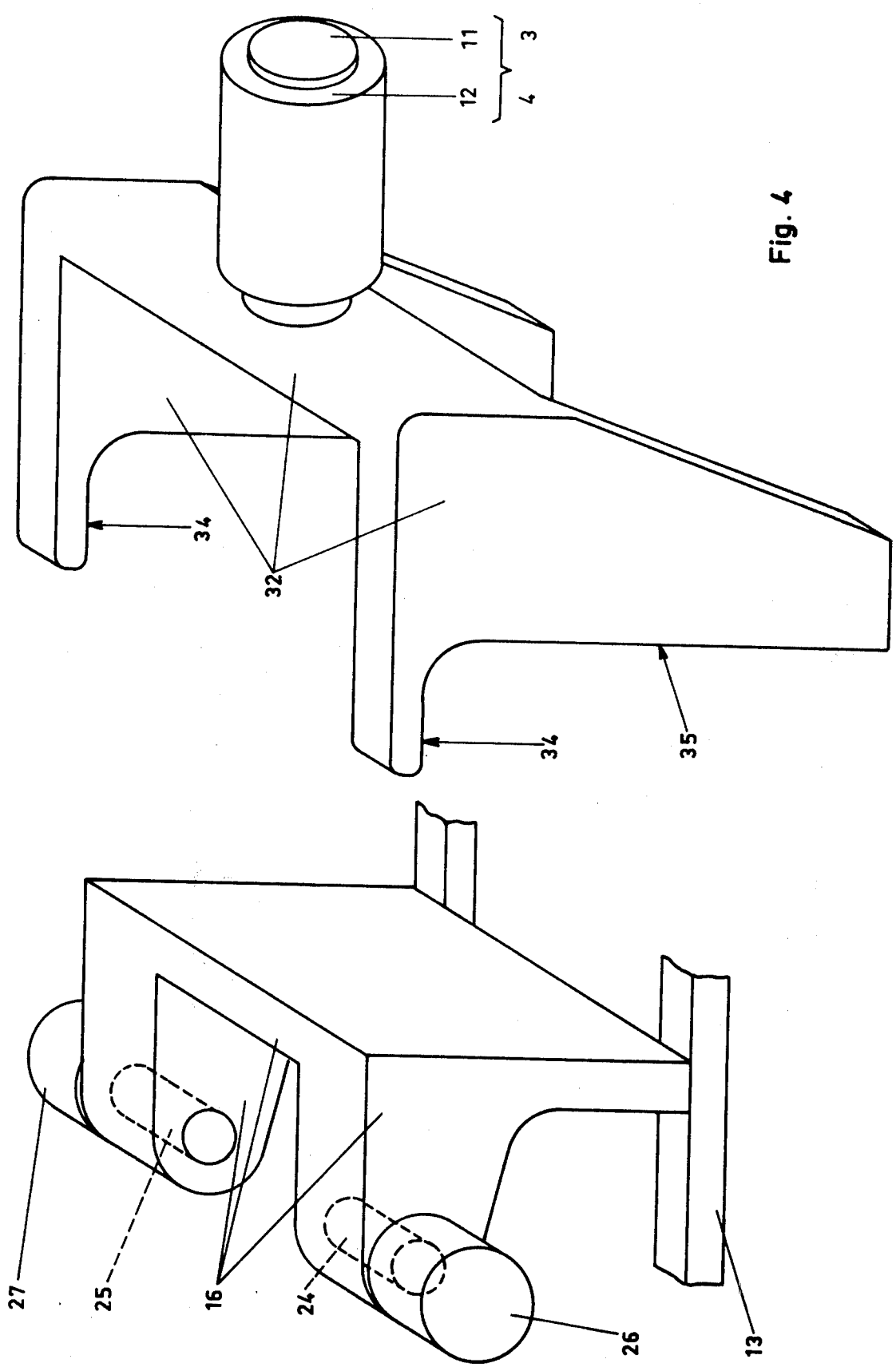
FIG. 4 shows diagrammatic perspective views of portions of the mechanism of FIGS. 2 and 3.

Each of the centering pins 3 or 4 has a central core 11 provided with a ring 12 of a suitable plastic material to prevent damage to the edges of the sheet of glass. The movement of each of the pins 3 or 4 is controlled by a mechanism combining both stationary and movable elements. The stationary elements include a frame 13 having three vertical webs 14, 15 and 16. The webs 14 and 16 support two rails 17 and 18. The web 14 has a threaded hole 19 containing a screw 20 forming an abutment. The screw is held in place by a set screw 21. The web 16, viewed from above in FIG. 3 and in perspective at the left of FIG. 4 is U-shaped. Rollers 26, 27 are mounted by means of axles 24, 25 on each of the arms 22, 23 of the U. This web 16 also supports the body of a drive device such as a jack 28.

The movable elements include a carriage 29 which is slidably mounted by bearings 30 on the rails 17 and 18. This carriage has a vertical fin 31, the end of which is coupled to the pin-carrying support 32 of a centering pin 3 or 4. This support is able to pivot with respect to the fin 31 about the axis 33 (FIG. 2). Viewed from overhead (FIG. 3), it is U-shaped, its two arms being spaced further apart than those of the U of the web 16 and being disposed in alignment with the rollers 26, 27 mounted on the stationary element 16. Each arm of the support 32, viewed in profile (FIGS. 2 and 4), has two guide surfaces of which surface 34 is horizontal and surface 35 is vertical. The carriage 29 has a boss 36, visible in FIG. 3, in alignment with the abutment screw 20. This carriage is driven in a translational movement on the rails 17 and 18 by the stem of the jack 28 from the position shown in FIG. 2 where the pin 3 or 4 is in its rest position, to the position where the boss 36 abuts against the screw 20. The jack stem 37 is threaded at its end and is extended by a ferrule 38 screwed onto the stem and held in place by a lock nut 39. The ferrule 38 is connected by a rod 40 to the carriage 29.

Figure 5:
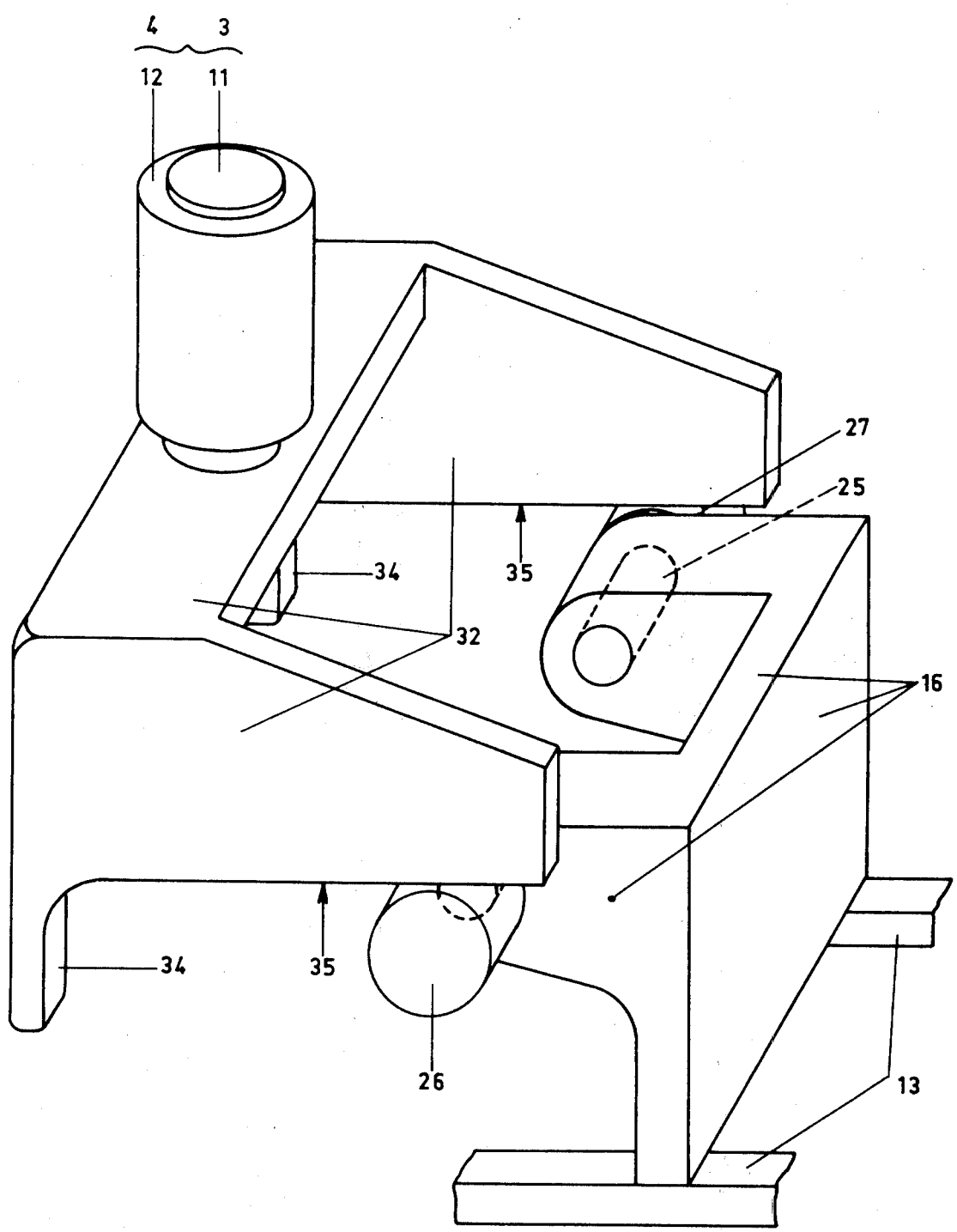
FIG. 5 is a diagrammatic view of the portions of FIG. 4 with the pin in its upright operating position.

The centering device operates in the following manner. With a pin 3 or 4 in the rest position shown in FIGS. 2, 3 and 4, the jack 28 is supplied with power and its stem 37 is moved toward the left in the figures. This drives the carriage 29 to the left. The fin 31 of the carriage accordingly moves the support 32 of the centering pin toward the left. The arms of the support 32 pass above the rollers 26, 27 up to the point where the rollers abut against edges 35, and the continued translational movement of the carriage continues to pull support 32 so that it pivots through 90°, thus bringing the pin 3 or 4 into its vertical position (FIG. 5).

As the stem 37 of the jack continues its rectilinear translational movement it continues to drive the support 32 and its pin 3 or 4. In the case of a pin 3, this movement lasts until the abutment screw 20 comes into contact with the abutment 36 of the carriage. Thus the position of maximum advancement of each pin 3 may be pre-adjusted by the corresponding screw 20. In the case of a pin 4, the abutments 20 may be disposed in sufficiently withdrawn position so that as the movement continues, the pin contacts the edge of the sheet of glass. Pins 4 continue to move forward, pushing the sheet of glass in front of them, until the sheet is arrested when its opposite edge comes into contact with the pins 3, which have already been raised. Thus, when the pins 4 have completed their forward movement the sheet of glass 2 is perfectly centered on the platform 1 of the machine in correspondence with the templet 5. At this moment, a pressing element which is not represented as it does not come within the scope of the present invention, presses the sheet of glass 2 against the platform 1 of the machine so as to keep it firmly in place while its edges are being ground. Then all the pins 3 and 4 begin to retract in synchronism to their rest positions so as to leave the area free for the grinding wheel.

This return movement is effected by actuating the jack 28 in the opposite direction. The stems 37 of the jacks are moved toward the right in the drawings, and the supports 32 and the pins 3 and 4 are moved away from the sheet of glass. Each of the supports passes above the rollers 26, 27 disposed opposite thereto. Then, when the rollers 26, 27 abut against the edge 34 of the support, the continued movement of the carriage 29 forces the support 32 to pivot through 90°, thus bringing the pin into its rest position. The operation will be clear from FIG. 5, wherein the pin-carrying support 32 moves to the right from the position shown until guide surface 34 abuts roller 26, whereupon the support 32 is rotated clockwise.

Figure 6:
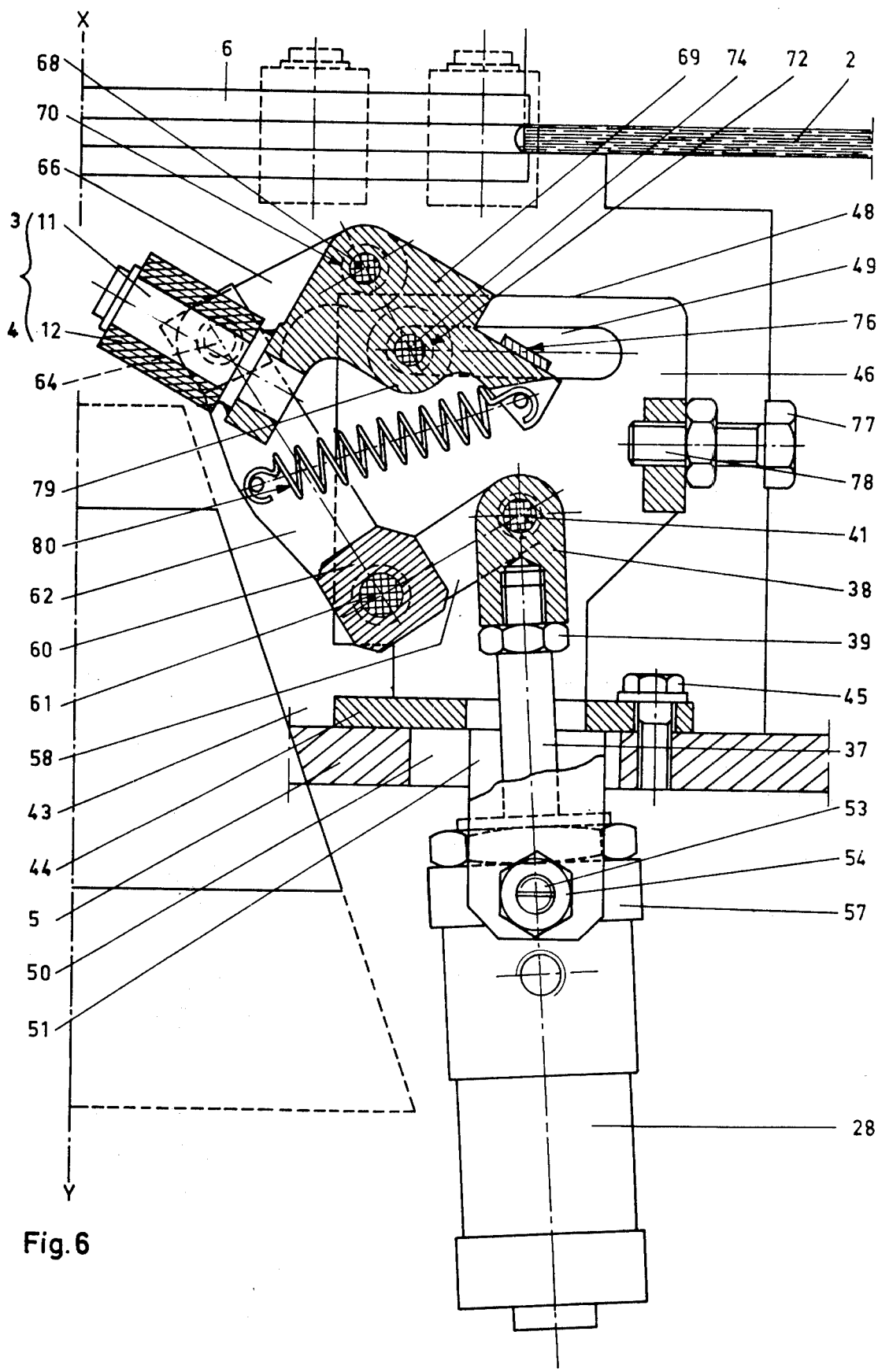
FIG. 6 is a vertical section of another embodiment of the pin drive mechanism.
Figure 7:
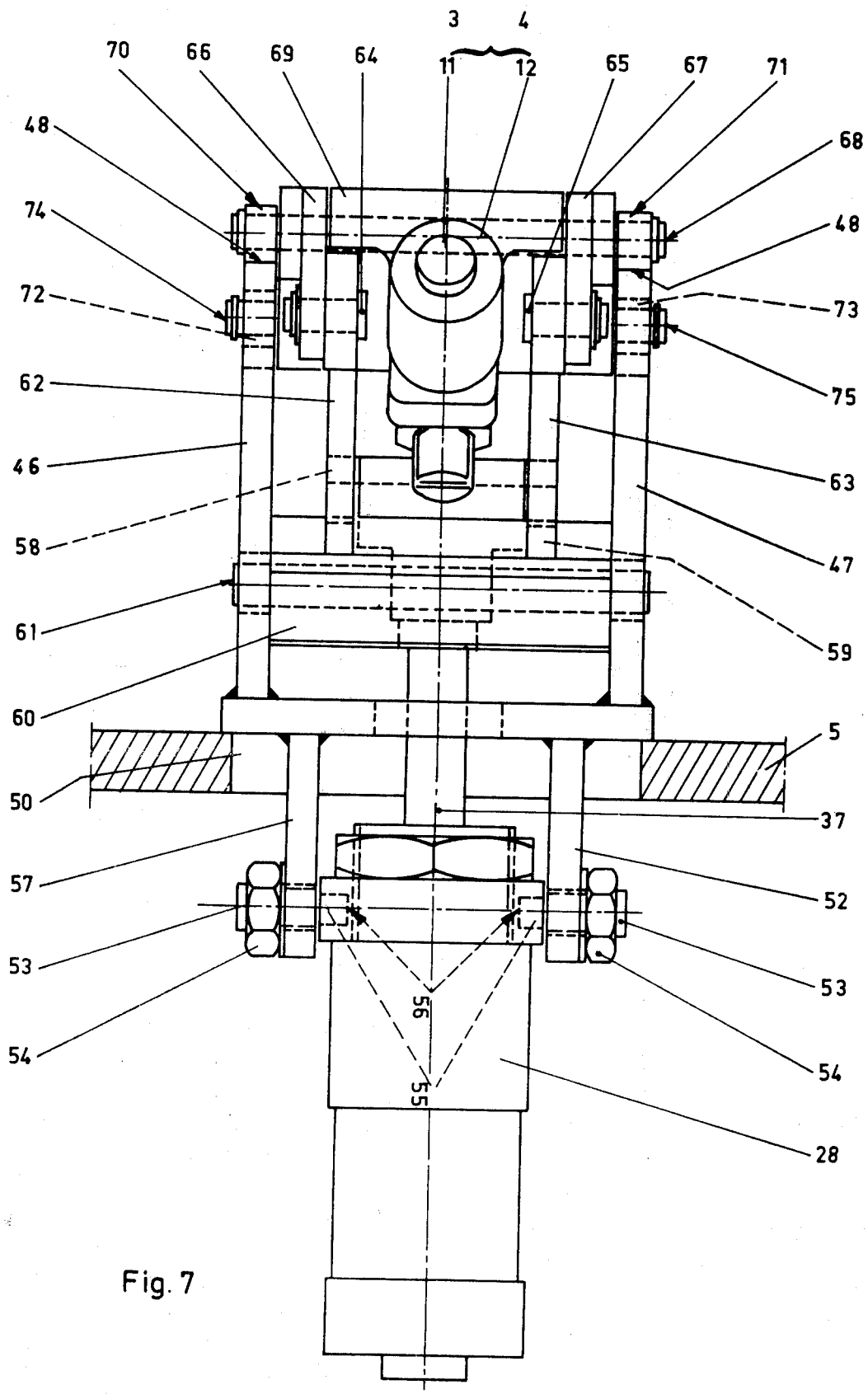
FIG. 7 is a vertical elevation perpendicular to FIG. 6.

FIGS. 6 and 7 illustrate another embodiment of pin-drive mechanism according to the invention which occupies less space in the horizontal plane. A stationary frame 43 is secured by its base 44 to the templet 5 by means of screws 45, only one of which is shown. The base 44 has two similar vertical webs 46, 47 which are disposed opposite one another and which each bear two guide planes 48 and 49. The guide planes are formed by openings in the webs 46, 47. Two further webs 51 and 52 are secured beneath the base 44. A jack 28 is mounted between the webs 51 and 52 by means of screws 53 held in place by lock nuts 54. At their ends these screws have cylindrical projections which engage in bore holes 56 of a collar 57 enclosing the jack 28, thus leaving the jack free to pivot between its support webs.

The stem 37 of the jack passes through an opening 50 in the templet 5. At its end, the stem has a threaded part onto which a ferrule 38 is screwed and held by lock nut 39. Stem 37 transmits the movement produced by the jack to the guide pin support 69 by means of three double connecting rods disposed in succession. Each double connecting rod consists of two identical connecting rods disposed opposite one another and having the same movement. The double connecting rod 58, 59 is pivotally attached at 41 to the ferrule 38, and is pivotable about the axis 61 carried by the two webs 46 and 47. This double connecting rod 58, 59 is rigidly connected to the succeeding double connecting rod 62, 63 by means of the hub 60. The ends of this double connecting rod 62, 63 are pivotally attached to the double connecting rod 66, 67 at 64, 65. The double connecting rod 66, 67 is pivotally attached at 68 to the support 69 of a guide pin 3 or 4. Each end of the axis 68 is provided with a roller 70, 71 which rolls on the guide plane 48. Two further rollers 72, 73 cooperate with the double guide plane 49 and rotate about axles 74, 75 mounted on the same support 69. As shown in FIG. 7, all these axles are parallel.

The support 69 bears a guide pin 3 or 4 and also an abutment 76 designed to cooperate, in a manner which will be described hereinafter, with an adjustable stationary abutment 78 mounted on the webs 46, 47 and held in place by a lock nut 77. The end of support 69, on the opposite side of the axis 74 from the axis 68, is connected by a spring 80 to the connecting rod 62, 63. At its left end in FIG. 6, the guide plane 49 includes a detent 79 consisting of a circular portion of diameter corresponding to that of the rollers 72, 73.

The device operates in the following manner. With a pin 3 or 4 in its turned down rest position, approximately parallel to the plane of the sheet of glass, the jack 28 is supplied with power such that its stem 37 moves downwards in the figures. Initially the rollers 72, 73 are lodged in the detents 79. As the stem 37 moves downward it actuates the system of double rods 58, 59, 62, 63, 66, 67 which thus push on the support 69. The latter, pushed on the one hand by the connecting rods 66, 67 and biased clockwise by the spring 80, initially begins to pivot about rollers 72 and 73 still lodged in the detents 79. The pivoting movement brings the pin 3 or 4 into a work position perpendicular to the plane of the sheet of glass 2. As the jack 28 continues its movement it continues to act on the support 69 through the intermediary of the connecting rods. This causes the rollers 72, 73 to be released from the detents 79.

The rollers 70, 71 thereupon begin to roll on the guides 48, and the rollers 72, 73 in the guides 49. More specifically, the support 69 continues to move to the right in FIG. 6, in a rectilinear translational movement. In the case of the pins 3, the movement continues until the abutments 76 and 78 are in contact. In the case of the pins 4 the corresponding abutments 78 are disposed in a sufficiently withdrawn position for the movement to continue. The pins 4 first contact the edge of the sheet of glass and then continue to advance, pushing the sheet in front of them until it comes into contact with the pins 3 which have previously been raised into the work position, as described in connection with FIG. 1.

When the pins 4 have completed their forward movement the sheet of glass 2 is perfectly centered with respect to the templet 5, the abutments 78 having been appropriately adjusted to achieve this end. When the sheet of glass is centered, a pressing element (not shown) presses the sheet of glass against the platform 1 of the machine to keep it firmly in place during the process of grinding its edges. At this point, all the pins 3 and 4 are retracted and returned in synchronism to their rest positions to leave the area free for the grinding wheel 6. This movement is effected by reversing the jacks 28 so that their stems 37 are displaced upwards. In this way, the supports 69 return to their starting position and the guide pins to their rest position.

I claim:

1. Apparatus for centering sheets of glass and the like on the platform of a machine for finishing the edges or surface of the sheet including a plurality of centering pins movable into contact with the sheet at spaced points on the periphery thereof, and drive mechanism for said pins which comprises a frame, a pin-carrying support carrying at least one of the pins and being mounted on the frame for movement between a rest position situated away from the platform at which the pin is turned down below the plane of the sheet on said platform and a second position situated adjacent said platform wherein the pin and support are moved to an upright position so that the pin engages the edge of the sheet, drive means connected to said support for turning said support and pin to the upright position whenever the support is advanced toward said platform and for retracting the support away from the platform, to thereby turn the pin and the support down to their rest position, guide means for guiding said support during said turning, advancing and retracting movements, and adjustable stop means for limiting the advance of said support toward the platform.

2. Apparatus according to claim 1 in which the pin in its upright position is substantially perpendicular to a sheet on said platform and the pin in its turned down position is approximately parallel to the sheet.

3. Apparatus according to claim 2 in which the pin-carrying support is guided for movement substantially parallel to the plane of the sheet during the portions of the advancing and retracting movements adjacent the sheet.

4. Apparatus according to claim 1 in which said guide means includes rollers means mounted for rotation about a fixed axis with respect to said frame, and said pin-carrying support includes two guide planes having an included angle equal to the angle between the upright and rest positions of the pin, said guide planes and said roller means cooperating to turn the support from the rest to the upright positions of the pin and vice versa during the advancing and retracting of the support.

5. Apparatus according to claim 4 in which the angle between said guide planes is 90°.

6. Apparatus according to claim 4 in which said drive means includes a carriage mounted on said frame for rectilinear movement therealong, and means for driving said carriage in reciprocal directions, said carriage being coupled to said pin-carrying support to advance and retract the support.

7. Apparatus according to claim 1 in which said guide means includes two rectilinear guides fixedly mounted on said frame, and said pin carrying support includes rollers cooperating with said rectilinear guides respectively, said pin-carrying support pivoting about one of said rollers during said advancing and retracting thereof.

8. Apparatus according to claim 7 in which the guide engaged by said one roller includes a detent for releasably detaining the roller during initial movement of the pin-carrying support from the rest position thereof.

9. Apparatus according to claim 7 in which said drive means includes connecting rod means pivoted to said pin-carrying support on one side of the axis of said one roller and spring means attached to the support on the other side of said axis for biasing the support to the upright position of the pin carried thereby.

10. Apparatus for centering sheets of glass and the like on the platform of a machine for finishing the edges or surface of the sheet including a plurality of centering pins movable into contact with the sheet at spaced points on the periphery thereof, and drive mechanism for said pins which comprises a frame, a pin-carrying support carrying at least one of the pins and being mounted on the frame for movement between a rest position situated away from the platform at which the pin is turned down below the plane of the sheet on said platform and a second position situated adjacent said platform wherein the pin and support are moved to an upright position so that the pin engages the edge of the sheet, drive means connected to said support for turning said support and pin to the upright position whenever the support is advanced toward said platform and for retracting the support away from the platform, to thereby turn the pin and the support down to their rest position, guide means for guiding said support during said turning, advancing and retracting movements, and adjustable stop means for limiting the advance of said support toward the platform, said guide means includes roller means mounted for rotation about a fixed axis with respect to said frame, and said pin-carrying support includes two guide planes having an included angle equal to the angle between the upright and rest positions of the pin, said guide planes and said roller means cooperating to turn the support from the rest to the upright positions of the pin and vice versa during the advancing and retracting of the support.

11. Apparatus for centering sheets of glass and the like on the platform of a machine for finishing the edges or surface of the sheet including a plurality of centering pins movable into contact with the sheet at spaced points on the periphery thereof, and drive mechanism for said pins which comprises a frame, a pin-carrying support carrying at least one of the pins and being mounted on the frame for movement between a rest position situated away from the platform at which the pin is turned down below the plane of the sheet on said platform and a second position situated adjacent said platform wherein the pin and support are moved to an upright position so that the pin engages the edge of the sheet, drive means connected to said support for turning said support and pin to the upright position whenever the support is advanced toward said platform and for retracting the support away from the platform, to thereby turn the pin and the support down to their rest position, guide means for guiding said support during said turning, advancing and retracting movements, and adjustable stop means for limiting the advance of said support toward the platform, said guide means incudes two rectilinear guides fixedly mounted on said frame, and said pin-carrying support includes rollers cooperating with said rectilinear guides respectively, said pin-carrying support pivoting about one of said rollers during said advancing and retracting thereof.

* * * * *